(12) United States Patent
Wu et al.

(10) Patent No.: US 10,802,727 B2
(45) Date of Patent: Oct. 13, 2020

(54) SOLID-STATE STORAGE POWER FAILURE PROTECTION USING DISTRIBUTED METADATA CHECKPOINTING

(71) Applicant: ScaleFlux, Inc., San Jose, CA (US)

(72) Inventors: Qi Wu, San Jose, CA (US); Duy Nguyen, Fremont, CA (US); Wenzhong Wu, Milpitas, CA (US); Jiangpeng Li, San Jose, CA (US); Yong Peng, Milpitas, CA (US)

(73) Assignee: SCALEFLUX, INC., San Jose, CA (US)

( * ) Notice: Subject to any disclaimer, the term of this patent is extended or adjusted under 35 U.S.C. 154(b) by 173 days.

(21) Appl. No.: 15/984,547

(22) Filed: May 21, 2018

(65) Prior Publication Data

US 2018/0356998 A1    Dec. 13, 2018

Related U.S. Application Data

(60) Provisional application No. 62/516,657, filed on Jun. 7, 2017.

(51) Int. Cl.
*G06F 12/00* (2006.01)
*G06F 3/06* (2006.01)
*G06F 11/14* (2006.01)
*G06F 12/02* (2006.01)

(52) U.S. Cl.
CPC .......... *G06F 3/0619* (2013.01); *G06F 3/0604* (2013.01); *G06F 3/065* (2013.01); *G06F 3/0644* (2013.01); *G06F 3/0659* (2013.01); *G06F 3/0679* (2013.01); *G06F 11/1441* (2013.01); *G06F 11/1451* (2013.01); *G06F 12/0246* (2013.01); *G06F 11/1469* (2013.01); *G06F 2212/7211* (2013.01)

(58) Field of Classification Search
CPC .... G06F 3/0619; G06F 3/0604; G06F 3/0679; G06F 3/0659; G06F 3/0644; G06F 3/065; G06F 11/1451; G06F 11/1441; G06F 11/1469; G06F 2212/7211
See application file for complete search history.

(56) References Cited

U.S. PATENT DOCUMENTS

| | | | |
|---|---|---|---|
| 2007/0043938 A1* | 2/2007 | May ...................... | G06F 9/4401 713/2 |
| 2016/0283138 A1* | 9/2016 | Lehman .................. | G06F 3/064 |
| 2018/0081551 A1* | 3/2018 | Lee ...................... | G06F 11/1068 |

* cited by examiner

*Primary Examiner* — Kalpit Parikh
(74) *Attorney, Agent, or Firm* — Hoffman Warnick LLC

(57) ABSTRACT

A system and method of implementing distributed metadata checkpointing in a storage device. A storage device is disclosed that includes storage device that employs distributed metadata checkpointing, including: flash memory; and a controller that collects metadata checkpoints and includes: a checkpoint partitioner that partitions a metadata checkpoint into a set of segments; and a segment loader that stores each segment of the set of segments into a spare region of a corresponding different flash memory pages during a write operation of data to flash memory.

20 Claims, 10 Drawing Sheets

SOLID-STATE STORAGE POWER FAILURE PROTECTION USING DISTRIBUTED METADATA CHECKPOINTING

PRIORITY CLAIM

This application claims priority to provisional application entitled, SOLID-STATE STORAGE POWER FAILURE PROTECTION USING DISTRIBUTED METADATA CHECKPOINTING, Ser. No. 62/516,657, filed on Jun. 7, 2017, the contents of which are hereby incorporated by reference.

TECHNICAL FIELD

The present invention relates to the field of solid-state data storage devices, and particularly to improving the efficiency of solid-state data storage device power failure protection.

BACKGROUND

Solid-state data storage devices, which use non-volatile NAND flash memory technology, are being pervasively deployed in various computing and storage systems. In addition to one or multiple NAND flash memory chips, each solid-state data storage device must contain a controller that manages all the NAND flash memory chips. The controller must maintain a variety of runtime metadata, which are critical to ensure correct and reliable operation of the entire solid-state data storage device. Such runtime metadata includes: (1) a logical block address (LBA) to physical block address (PBA) mapping table, which records the injective mapping between LBA and PBA, and (2) other non-mapping metadata that may include but is not limited to: the location of all the bad blocks, the number of program/erase (P/E) cycles endured by each flash memory block, and retention time and read statistics of data in each block. During normal operation, the controller keeps all the metadata in SRAM and/or DRAM in order to facilitate the maintenance and very low-latency access. When the storage device is being normally powered off, the controller will be given sufficient time to flush sufficient metadata information to flash memory chips, which can ensure the controller to quickly and entirely reconstruct the up-to-date metadata once the storage device is powered up later on.

In the case of sudden power failure, the storage device controller may not have enough time to flush sufficient metadata information to flash memory chips. To ensure data storage consistency in the presence of power failure, the solid-state data storage device controller typically employs the following processes.

The first process is to embed reverse LBA-PBA mapping into each physical flash memory page. Each flash memory physical page typically leaves several bytes (e.g., 8 bytes) of spare storage space to store user-defined information. Hence, the controller can store the associated LBA (which is typically 4 bytes or less) into such spare storage space in each physical memory page, which forms reverse LBA-PBA mapping. If necessary, the controller could exhaustively scan all the physical pages to reconstruct the entire LBA-PBA mapping table, which however could take a relatively long time (e.g., few hours).

A further process used to reduce the LBA-PBA mapping table reconstruction time after power failure is to have the controller periodically perform mapping table incremental checkpointing. For each checkpointing, the controller stores only the changes made on the mapping table since the last checkpointing.

As a third process, the controller can also checkpoint the other non-mapping metadata (e.g., location of bad blocks, P/E cycle number, etc.).

All these metadata checkpointing operations write to a dedicated flash memory storage region. When the storage device is powered up after a power failure, the controller must carry out the so-called "crash recovery" procedure to restore to a consistent storage device state. During crash recovery, the controller first tries to reconstruct the entire metadata through reading those checkpoints. If reading checkpoints fails to reconstruct the entire LBA-PBA mapping table, the controller further scans the reverse LBA-PBA mapping information embedded in certain physical pages.

However, the flash memory write activities caused by periodic metadata checkpointing inevitably interfere with the flash memory write/read activities serving user I/O requests, which leads to solid-state data storage device performance degradation. This directly results in a trade-off between the crash recovery quality and storage device performance: if the controller performs metadata checkpointing more frequently, the crash recovery could be accomplished in a shorter latency and achieve higher accuracy on reconstructing operational metadata such as P/E cycle number and data retention time. Nevertheless, more frequent metadata checkpointing causes more severe interference with normal I/O requests, leading to more significant storage device performance degradation.

SUMMARY

Aspects of this disclosure describe techniques to fundamentally eliminate the crash recovery quality versus storage device performance trade-off. In particular, solutions are provided that can enable high-quality crash recovery (i.e., very low crash recovery latency and very high metadata reconstruction accuracy) without incurring any checkpointing-induced storage device performance degradation.

Accordingly, an embodiment of the present disclosure is directed to a system and method for eliminating metadata checkpointing-induced storage device performance degradation while maintaining high-quality crash recovery.

A first aspect provides a storage device that employs distributed metadata checkpointing, comprising: flash memory; and a controller that collects metadata checkpoints and includes: a checkpoint partitioner that partitions a metadata checkpoint into a set of segments; and a segment loader that stores each segment of the set of segments into a spare region of a corresponding different flash memory pages during a write operation of data to flash memory.

A second aspect provides a method that employs distributed metadata checkpointing in a storage device, comprising: collecting and storing a metadata checkpoint; partitioning the metadata checkpoint into a set of segments; receiving a write request to write data to flash memory; and writing the data into a set of flash memory pages, wherein during each write operation into a page, a different one of the segments is loaded into the spare region of the page.

A third aspect provides a storage infrastructure that employs distributed metadata checkpointing, comprising: a host; flash memory; and a controller that collects metadata checkpoints and includes: a checkpoint partitioner that partitions a metadata checkpoint into a set of segments; and a segment loader that stores each segment of the set of segments into a spare region of corresponding different flash memory pages during a write operation of data received from the host to flash memory.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
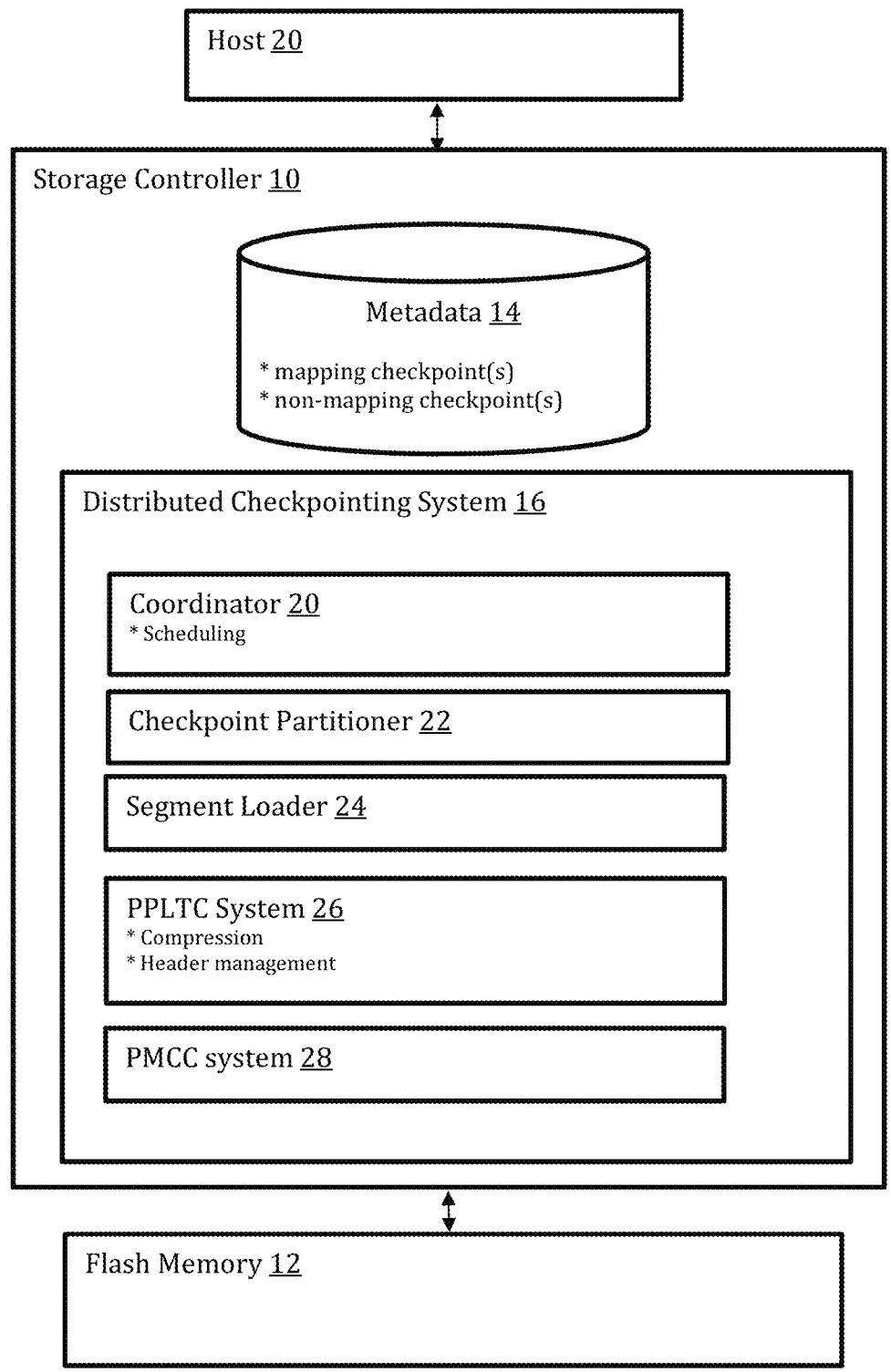
FIG. 1 depicts a flash memory controller having a distributed checkpointing system in accordance with an embodiment.

FIG. 1 depicts a storage infrastructure that generally includes a host 20, a storage controller (i.e., "controller") 10 and flash memory 12. The controller 10 and flash memory 12 may collectively be referred to as a storage device. As will be described in further detail, the controller 10 includes a distributed checkpointing system 16 that improves the underlying data storage technology.

Solid-state data storage devices internally manage data on their physical storage media (i.e., flash memory chips) in the unit of constant-size (e.g., 4k-byte) sector. Each physical sector is assigned with one unique physical block address (PBA). Instead of directly exposing the PBAs to external hosts, solid-state storage devices expose a continuous space of logical block address (LBA) and internally manage/maintain an injective mapping between LBA and PBA. The software component responsible for managing the LBA-PBA mapping is called flash translation layer (not shown). Since NAND flash memory does not support update-in-place, data update/rewrite to one LBA will trigger a change of the LBA-PBA mapping (i.e., the same LBA is mapped with another PBA to which the new data are physically written). Therefore, the storage controller 10 must maintain an LBA-PBA mapping table and ensure this mapping table is always consistent with the current storage device state.

As noted, NAND flash memory cells are organized in an array/block/page hierarchy, where one NAND flash memory array is partitioned into a large number (e.g., thousands) of blocks, and each block contains a certain number (e.g., 256) of pages. The size of each flash memory physical page typically ranges from 8 kB to 32 kB, and the size of each flash memory block is typically tens of MBs. Data are programmed and fetched in the units of page. However, flash memory cells must be erased before being re-programmed (or re-written), and the erase operation is carried out in the unit of block (i.e., all the pages within the same block must be erased at the same time).

The storage reliability of NAND flash memory cells gradually degrades as they endure more and more program/erase (P/E) cycles, which is called flash memory wear-out. In order to maximize the storage device lifetime, the storage controller 10 must appropriately schedule the erase operations among all the flash memory blocks in order to equalize the wear-out of all the flash memory blocks. The data storage reliability also depends on some other factors, including but not limited to (1) data retention time: data being stored in flash memory cells gradually decay over the time, i.e., data storage reliability will become worse as data retention time gets longer; and (2) read disturbance: when a page is being read, the read operation will slightly degrade the storage reliability of this page and its neighboring pages. The effect of read disturbance accumulates, i.e., the data storage reliability of one flash memory page gradually degrades as more and more read operations are carried out over this page and its neighboring pages. Moreover, some flash memory blocks could become so-called "bad blocks" that cannot satisfy the flash memory operational specs and hence should not be used to store user data. As a result, in addition to the LBA-PBA mapping table, the controller 10 must maintain a set of metadata 14 including (but not limited to) P/E cycle numbers of all the blocks, data retention time and read statistics of all the blocks, and location of bad blocks.

During normal operations, the controller 10 keeps all the metadata 14 (e.g., LBA-PBA mapping table, P/E cycle numbers of all the blocks, etc.) in SRAM and/or DRAM in order to achieve high-speed operation. When the storage device is being normally powered off, the storage controller 10 will be given sufficient time to flush sufficient metadata information to flash memory 12, which can ensure the controller to quickly reconstruct the up-to-date metadata 14 once the storage device is powered up later on.

Figure 2:
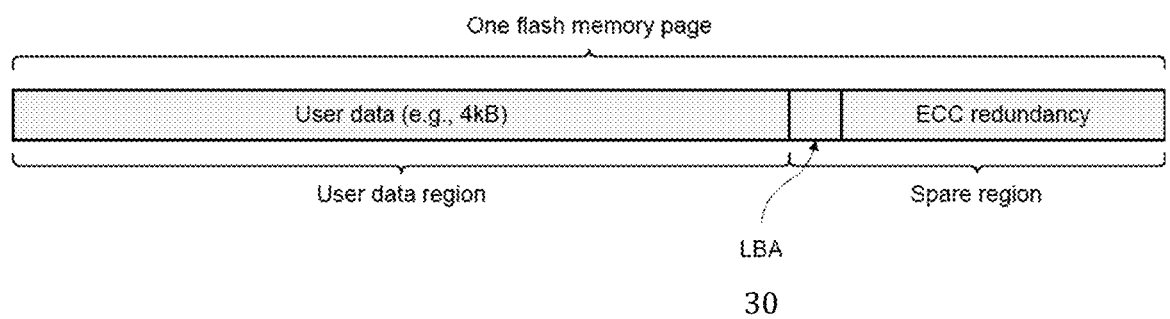
FIG. 2 depicts an illustration of one flash memory page consisting of a user data region and a spare region.

In the case of sudden power failure, the controller 10 may not have enough time to backup all the metadata 14 to flash memory 12. To ensure data storage consistency in the presence of power failure, the solid-state data storage controller 10 typically employs the following procedures:

Embeds a reverse LBA-PBA mapping 30 into each physical flash memory page, as shown in FIG. 2. Each physical flash memory page contains two storage regions, including user data region to store a user data sector (e.g., 4 kB), and spare region to store certain user-defined information and error correction coding (ECC) redundancy for protecting the entire page. As shown, the storage controller 10 typically embeds the associated LBA 30 (which is typically 4 B or less) into the spare region. With such embedded reverse LBA-PBA mapping information distributed throughout all the flash memory pages, the controller 10 can exhaustively scan all the flash memory pages to restore the entire LBA-PBA mapping table, which however tends to take a long time (e.g., hours).

To reduce the LBA-PBA mapping table reconstruction time after power failure, the controller 10 typically carries periodic LBA-PBA mapping table incremental metadata checkpoints, i.e., it stores only the changes being made to the mapping table since the previous checkpointing event (i.e., a mapping checkpoint). As a result, during crash recovery, the controller 10 only needs to scan a small percentage of flash memory pages that are programmed after the last mapping table incremental checkpointing. This leads to much shorter crash recovery latency.

Because of the relatively small size of the other non LBA-PBA mapping table metadata, e.g., location of bad blocks, P/E cycle number, etc., the controller 10 typically checkpoints those metadata (i.e., a non-mapping checkpoint) entirely. During the crash recovery, the controller reconstructs those metadata based upon the latest checkpoint.

Figure 3:
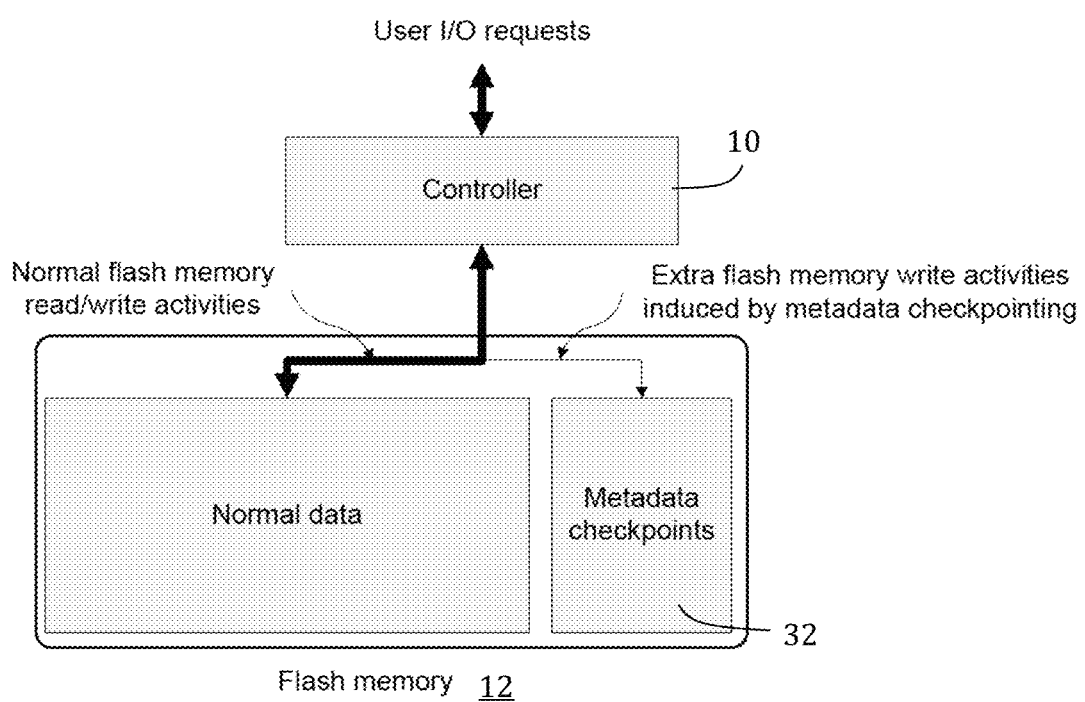
FIG. 3 depicts an illustration of conventional centralized metadata checkpointing that induces extra flash memory writes.

As shown in FIG. 3, in prior practice, the storage controller 10 explicitly writes the periodic metadata checkpoints 32 to a dedicated flash memory storage space 32, which is separate from and is much smaller than the space storing normal user data. This is referred to as centralized metadata checkpointing. Such centralized metadata checkpointing causes extra flash memory write activities, which however inevitably interfere with normal user I/O requests and hence degrade the overall storage device performance. This directly results in a trade-off between the crash recovery quality and storage device performance: if the controller 10 performs centralized metadata checkpointing more frequently, the crash recovery could be accomplished in a shorter latency and achieve higher accuracy on reconstructing operational metadata such as P/E cycle number and data retention time. Nevertheless, more frequent centralized metadata checkpointing causes more severe interference with normal I/O requests, leading to more significant storage device performance degradation.

Aiming to eliminate the performance degradation caused by metadata checkpointing without sacrificing crash recovery quality, the present embodiments utilize a distributed checkpointing system 16 in replacement of the conventional centralized metadata checkpointing. As shown in FIG. 1, controller 10 collects and stores metadata 14 that generally include both mapping checkpoint information and non-mapping checkpoint information. Distributed checkpointing system 16 generally includes: a coordinator 20 is provided that schedules checkpointing operations (e.g., periodically, based on a heuristic, etc.); a checkpoint partitioner 22 that partitions a metadata checkpoint into a set of segments; and a segment loader 24 which, during a data write operation, stores each of the segments into a spare region in a corresponding different flash memory page being used to store the data. In this manner, the metadata checkpoint is distributively stored in a set of pages during a write operation without requiring separate write operations to flash memory 12. In addition, distributed checkpointing system 16 may also employ a per-page lightweight transparent compression (PPLTC) system 26 and/or a per-metadata checkpoint compression (PMCC) system 28 (described in further detail below), which utilize compression to reduce the number of segments and corresponding different pages required to store a checkpoint.

Figure 4:
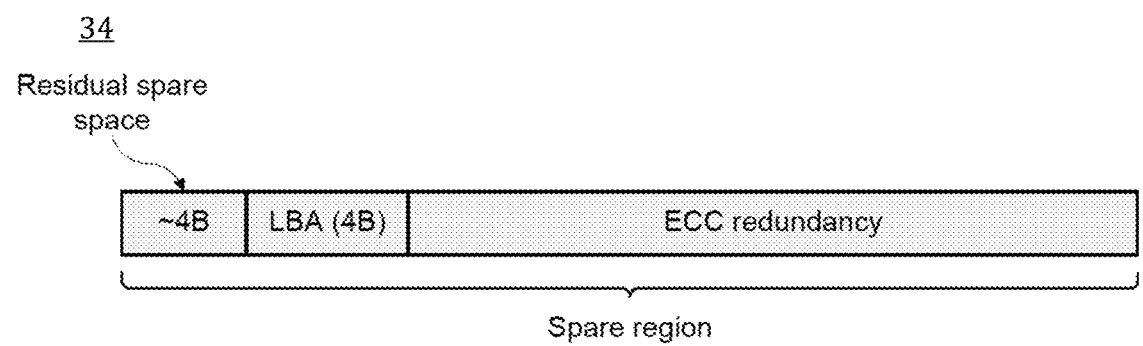
FIG. 4 depicts an illustration of the residual spare space left unoccupied in each spare region.

As discussed above, each flash memory page has a spare region that records the LBA associated with current physical page in addition to the ECC redundancy. (The process of storing the LBA in an associated physical page is still utilized when employing distributing checkpointing.) In practice, one LBA is generally four bytes (4B), which typically leaves a few bytes of residual space unoccupied in the spare region, as shown in FIG. 4. The approach used herein to achieve distributed checkpointing is to distribute (and track) metadata checkpoints across the unused spare region space of different flash memory pages. In these illustrative embodiments, a metadata checkpoint segment is written into the residual space of a page when user data is written to the page by the controller 10. Thus, whenever a write operation is to be performed to a page, the controller determines if there is metadata checkpoint information to be written, and if so writes a (e.g., 4B) segment to the residual space. By completely removing separate flash memory write activities invoked by metadata checkpointing, the distributed checkpoint system 16 (FIG. 1) can correspondingly eliminate the storage device performance degradation.

Figure 5:
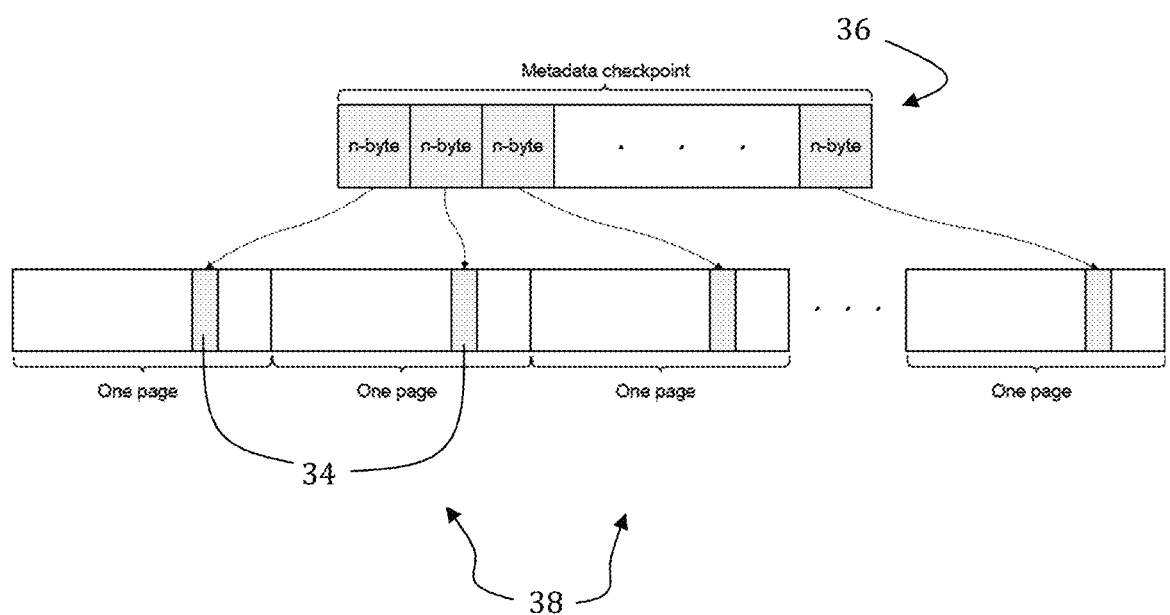
FIG. 5 depicts an embodiment that distributes each metadata checkpoint across the unused spare region space within a number of flash memory pages.

FIG. 5 depicts an example of the process. As shown, a metadata checkpoint 36 is first partitioned into a set of segments by checkpoint partitioner 22 (FIG. 1). Assuming the residual spare space 34 in each flash memory page 38 can accommodate an n-byte segment (e.g., a 4-byte segment) in support of distributed metadata checkpointing, the metadata checkpoint is partitioned into m n-byte segments, where m is the total number of segments making up the checkpoint 36. All the n-byte segments that make up the checkpoint 36 may be embedded into corresponding different flash memory physical pages 38 being consecutively written as part of the write process by a segment loader 24 (FIG. 1). Segment loader 24 may also track the location of the segments in the event they are later needed to reconstruct the checkpoint 36.

Figure 6:
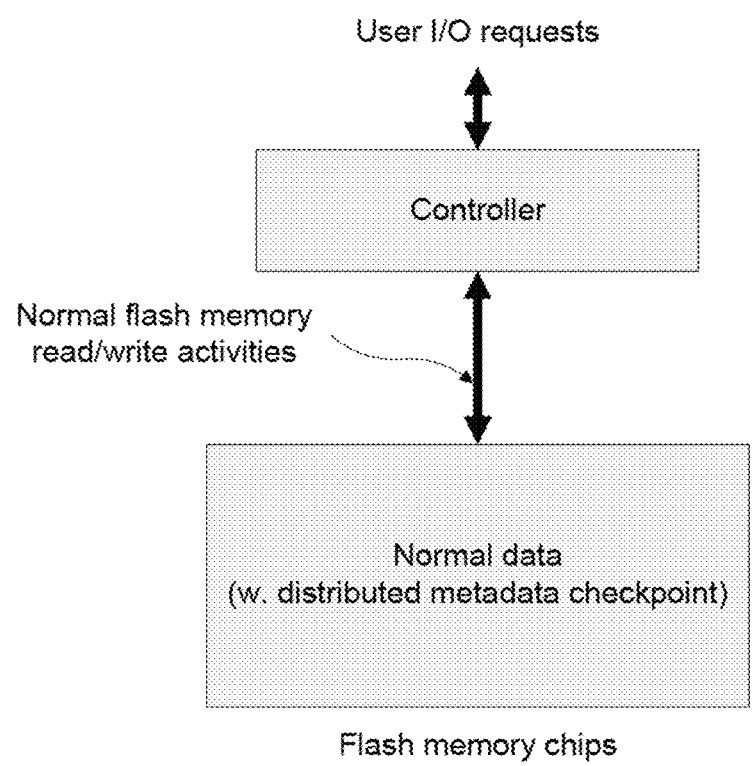
FIG. 6 depicts an illustration of the absence of extra flash memory write activities when using an embodiment this invention.

As shown in FIG. 6, the distributed metadata checkpointing process does not introduce any extra flash memory write activities because each metadata checkpoint is embedded with normal flash memory activities amongst m consecutive pages. This approach essentially eliminates the impact of metadata checkpointing on storage device I/O performance.

Because each metadata checkpoint must be segmented and loaded into a potentially large number of pages, it may take longer than desired to complete the checkpointing. To reduce the latency of completing each distributed metadata checkpointing operations, additional enhancements may be utilized. In a first enhancement, each flash memory physical page can be processed to accommodate a larger-size segment from the metadata checkpoint. In a second approach, the size of each metadata checkpoint can be reduced. Two illustrative embodiments are provided to reduce the distributed metadata checkpointing latency based on the above two approaches.

Figure 7:
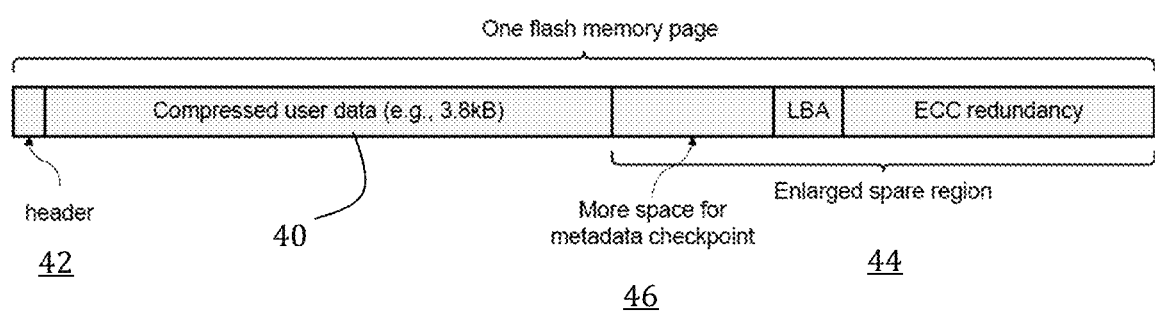
FIG. 7 depicts an illustration of using per-page lossless compression to reduce metadata checkpointing latency according to an embodiment.

The first technique, shown by way of example in FIG. 7, enables each flash memory physical page to accommodate a larger-size segment from the metadata checkpoint using a per-page lightweight transparent compression (PPLTC) system 26 (FIG. 1). The PPLTC system 26 attempts to compress the data 40 being written to each page using a lightweight lossless data compression algorithm. If the data is compressible, the spare region 44 is enlarged by the extra space 46 left by the compressed sector. The enlarged spare region 44 can directly store more data for metadata checkpointing within each flash memory page. For example, if the PPLTC system 26 could compress the original 4 kB user data sector to 3.8 kB, the flash memory page could store about 200 B of the metadata checkpoint (as opposed to 4B). Note that this may result in variable sized segments being distributively stored, and the total number of segments required for a checkpoint will be determined dynamically and thus vary from checkpoint to checkpoint.

As shown in FIG. 7, PPTLC system 26 also records a header 42 in each flash memory page containing the following information: (1) whether the data being written is compressed, and (2) if the data is compressed, the header 42 may further contain the length of the compressed data sector and the length of metadata checkpoint segment being stored in the page.

Figure 8:
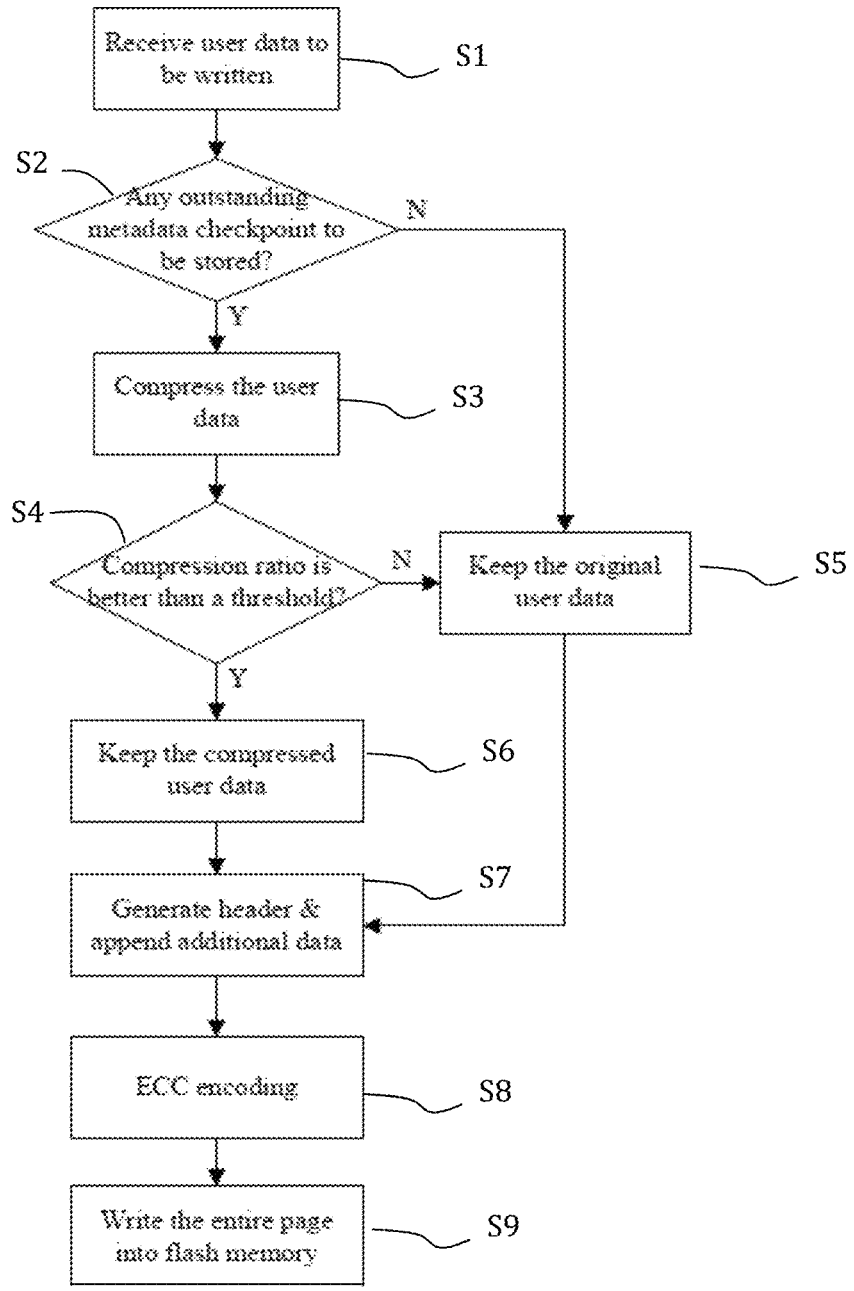
FIG. 8 depicts a write operational flow diagram when using per-page lossless data compression according to an embodiment.

FIG. 8 shows the corresponding operational flow diagram for a flash memory page write using PPTLC system 26 to perform distributed metadata checkpointing. At S1, user data to be written is received, and at S2, during a flash memory write, a check is made whether there is an outstanding metadata checkpoint segment to be stored in the current page. If no, then the user data is processed without compression at S5 (and may or may not receive a header). If yes at S2, then the PPTLC system 26 tries to compress the user data at S3, and uses a pre-defined compression ratio threshold at S4 to determine whether to store the compressed data at S6 or the original data S5 in the flash memory page. At S7, the controller device generates the header and appends the additional data (i.e., the metadata checkpoint segment and LBA). At S8, ECC encoding is applied to the page to generate the ECC coding redundancy, and at S9 the entire page is written into flash memory.

Figure 9:
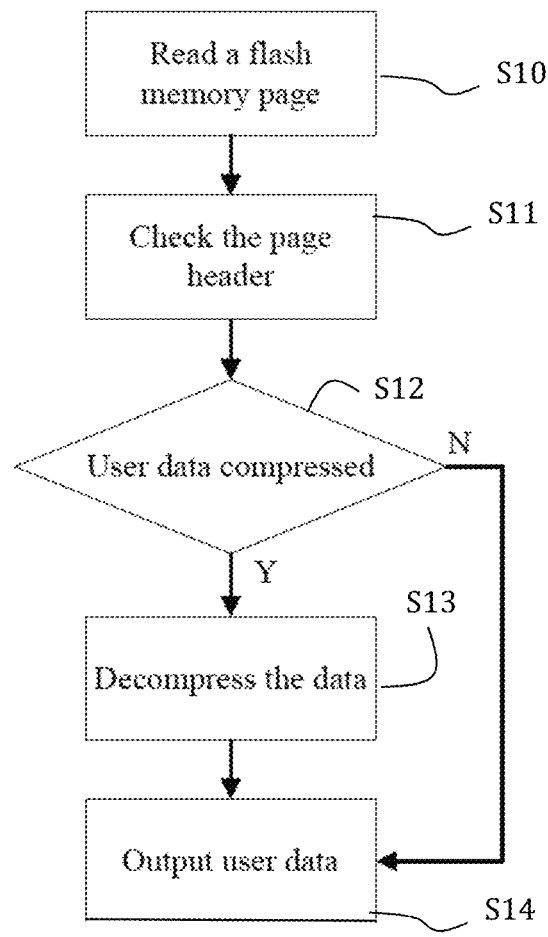
FIG. 9 depicts a read operational flow diagram when using per-page lossless data compression according to an embodiment.

FIG. 9 shows the corresponding operational flow diagram for a flash memory page read that employs PPTLC system 26. During flash memory read at S10, the controller checks the header at S11 and determines if data compression was employed at S12. If yes, the data is decompressed at S13 and outputted at S14. If no at S12, no decompression is required.

Figure 10:
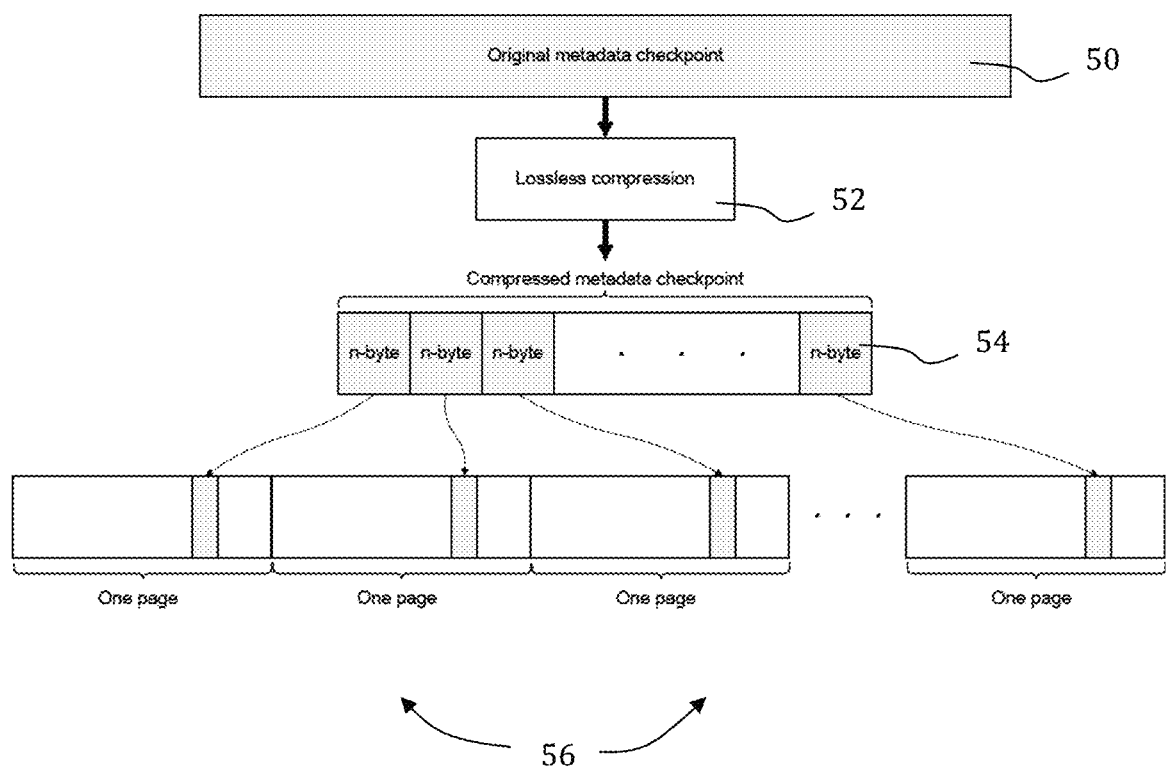
FIG. 10 depicts a diagram of using per-metadata-checkpoint compression to reduce metadata checkpointing latency according to an embodiment.

As shown in FIG. 10, a second technique may also be employed to reduce the size of each metadata checkpoint using a per-metadata checkpoint compression (PMCC) system 28 (FIG. 1). In this approach, once the metadata checkpoint 50 is ready to be written to flash memory, the PMCC system 28 first applies lossless data compression 52 to compress the metadata checkpoint 50, and distributes the compressed metadata checkpoint 54 across a number of flash memory pages 56. Due to the smaller size of compressed metadata checkpoint, the checkpointing operation requires fewer segments and pages, and should finish in a shorter time.

It is understood that the controller 10 may be implemented in any manner, e.g., as an integrated circuit board or a controller card that includes a processing core, I/O and processing logic. Processing logic may be implemented in hardware/software, or a combination thereof. For example, some of the aspects of the processing logic may be implemented using field programmable gate arrays (FPGAs), ASIC devices, or other hardware-oriented system.

Other aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A storage device that employs distributed metadata checkpointing, comprising:
    flash memory; and
    a controller that:
        performs a write operation of data to a plurality of memory pages of the flash memory; and
        collects metadata checkpoints;
    the controller further including:
        a checkpoint partitioner that partitions a metadata checkpoint into a plurality of metadata checkpoint segments; and
        a segment loader that stores each metadata checkpoint segment of the plurality of metadata checkpoint segments into a spare region of a corresponding different flash memory page of the plurality of memory pages during the write operation of data to flash memory.

2. The storage device of claim 1, wherein the corresponding different flash memory pages comprise consecutive flash memory pages.

3. The storage device of claim 1, further comprising a system that compresses the metadata checkpoint to reduce a number of flash memory pages required to store the metadata checkpoint.

4. The storage device of claim 1, further comprising a system that attempts to compress the data being stored in each of the corresponding different flash memory pages in order to increase the spare region in each flash memory page to accommodate larger checkpoint segments and reduce a number of flash memory pages required to store the metadata checkpoint.

5. The storage device of claim 4, further comprising a system that stores a header in each flash memory page that: indicates whether compression was used, a size of the compressed data, and a size of the checkpoint segment.

6. The storage device of claim 1, wherein the metadata checkpoint includes mapping information and non-mapping information.

7. The storage device of claim 1, wherein the controller further comprises a coordinator for scheduling checkpointing operations.

8. A method that employs distributed metadata checkpointing in a storage device, comprising:
    collecting and storing a metadata checkpoint;
    partitioning the metadata checkpoint into a plurality of metadata checkpoint segments;
    performing a write operation of data to a plurality of memory pages of a flash memory; and
    loading each metadata checkpoint segment of the plurality of metadata checkpoint segments into a spare region of a corresponding different flash memory page of the plurality of memory pages during the write operation of data to the flash memory.

9. The method of claim 8, wherein the set of flash memory pages comprise consecutive flash memory pages.

10. The method of claim 8, further comprising compressing the metadata checkpoint prior to the partitioning to reduce a number of flash memory pages required to store the metadata checkpoint.

11. The method of claim 8, further comprising: attempting to compress the data being stored in each flash memory page in order to increase the spare region in each flash memory page to accommodate larger checkpoint segments and reduce a number of flash memory pages required to store the metadata checkpoint.

12. The method of claim 11, further comprising storing a header in each flash memory page that: indicates whether compression was used, a size of the data if compressed, and a size of the segment.

13. The method of claim 8, wherein the metadata checkpoint includes mapping information and non-mapping information.

14. The method of claim 8, further comprising scheduling a checkpointing operation.

15. A storage infrastructure that employs distributed metadata checkpointing, comprising:
    a host;
    flash memory; and
    a controller that:
        performs a write operation of data received from the host to a plurality of memory pages of the flash memory; and
        collects metadata checkpoints;
    the controller further including:
        a checkpoint partitioner that partitions a metadata checkpoint into a plurality of metadata checkpoint segments; and a segment loader that stores each metadata checkpoint segment of the plurality of metadata checkpoint segments into a spare region of corresponding different flash memory page of the plurality of memory pages during the write operation of data received from the host to flash memory.

16. The storage infrastructure of claim 15, wherein the different flash memory pages comprise consecutive flash memory pages.

17. The storage infrastructure of claim 15, further comprising a system that compresses the metadata checkpoint to reduce a number of flash memory pages required to store the metadata checkpoint.

18. The storage infrastructure of claim 15, further comprising a system that attempts to compress the data being stored in each of different flash memory pages in order to increase the spare region in each flash memory page to accommodate larger checkpoint segments and reduce a number of flash memory pages required to store the metadata checkpoint.

19. The storage infrastructure of claim 18, further comprising a system that stores a header in each flash memory page that: indicates whether compression was used, a size of the compressed data, and a size of the checkpoint segment.

20. The storage infrastructure of claim 15, wherein the metadata checkpoint includes mapping information and non-mapping information.

* * * * *